United States Patent
Ding (10) Patent No.: US 8,655,836 B2
(45) Date of Patent: Feb. 18, 2014

(54) METHOD, DEVICE AND SYSTEM FOR IMPLEMENTING DATA SYNCHRONIZATION BETWEEN SOURCE DATABASE AND TARGET DATABASE

(75) Inventor: Qipeng Ding, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/258,244

(22) PCT Filed: Apr. 13, 2010

(86) PCT No.: PCT/CN2010/071725
§ 371 (c)(1),
(2), (4) Date: Mar. 29, 2012

(87) PCT Pub. No.: WO2010/145277
PCT Pub. Date: Dec. 23, 2010

(65) Prior Publication Data
US 2012/0185432 A1   Jul. 19, 2012

(30) Foreign Application Priority Data

Oct. 23, 2009   (CN) .......................... 2009 1 0236502

(51) Int. Cl.
*G06F 17/00*   (2006.01)
(52) U.S. Cl.
USPC .......................................... 707/620; 707/803
(58) Field of Classification Search
USPC ......... 707/620, 610, 611, 612, 614, 624, 656, 707/E17.111
See application file for complete search history.

(56) References Cited

U.S. PATENT DOCUMENTS

| 6,466,951 B1 | 10/2002 | Birkler et al. |
| 6,798,191 B1 * | 9/2004 | Macfarlane et al. .......... 324/157 |

(Continued)

FOREIGN PATENT DOCUMENTS

| CN | 1262481 A | 8/2000 |
| CN | 1339134 A | 3/2002 |

(Continued)

OTHER PUBLICATIONS

Wong et al.—"Oracle Streams: A High Performance Implementation for Near Real Time Asynchronous Replication"—Data Engineering, 2009. ICDE '09. IEEE 25th International Conference on—Mar. 29, 2009-Apr. 2, 2009; pp. 1363-1374.*

(Continued)

*Primary Examiner* — Jean B Fleurantin
*Assistant Examiner* — Anh Ly
(74) *Attorney, Agent, or Firm* — Oppedahl Patent Law Firm LLC (57) ABSTRACT

The disclosure discloses a method for implementing data synchronization between a source database and a target database, which includes: a synchronization device acquires at least one first Logical Change Record (LCR) and a keyword of the first LCR from the source database; the synchronization device determines whether there is a second LCR with a keyword as same as the keyword of the first LCR in the synchronization device itself; the synchronization device processes the first LCR to generate a processed LCR according to the determination result, so that the synchronization device stores only one LCR containing the keyword of the first LCR; and the synchronization device sends the processed LCR to the target database. Accordingly, the disclosure also discloses a device and system for implementing data synchronization between a source database and a target database. The disclosure can reduce the data transmission load when implementing the synchronization between the source database and the target database.

8 Claims, 3 Drawing Sheets

(56) References Cited

U.S. PATENT DOCUMENTS

| | | | |
|---|---|---|---|
| 6,889,231 B1* | 5/2005 | Souder et al. | 707/999.01 |
| 6,980,988 B1* | 12/2005 | Demers et al. | 707/999.008 |
| 7,031,974 B1* | 4/2006 | Subramaniam | 707/999.102 |
| 7,814,067 B2* | 10/2010 | Souder et al. | 707/682 |
| 8,086,564 B2* | 12/2011 | Kundu et al. | 707/610 |
| 2004/0193952 A1* | 9/2004 | Narayanan et al. | 714/13 |
| 2005/0055384 A1* | 3/2005 | Ganesh et al. | 707/202 |
| 2005/0076068 A1* | 4/2005 | Fowler et al. | 707/201 |
| 2006/0004838 A1* | 1/2006 | Shodhan et al. | 707/102 |
| 2006/0047713 A1* | 3/2006 | Gornshtein et al. | 707/202 |
| 2006/0277223 A1 | 12/2006 | Gupta et al. | |
| 2007/0038642 A1* | 2/2007 | Durgin et al. | 707/10 |
| 2007/0073787 A1 | 3/2007 | Tysowski et al. | |
| 2007/0255763 A1* | 11/2007 | Beyerle et al. | 707/201 |
| 2008/0133580 A1* | 6/2008 | Wanless et al. | 707/102 |
| 2008/0162590 A1* | 7/2008 | Kundu et al. | 707/202 |
| 2010/0036831 A1* | 2/2010 | Vemuri et al. | 707/5 |
| 2010/0198920 A1* | 8/2010 | Wong et al. | 709/206 |
| 2011/0282706 A1* | 11/2011 | Ezra et al. | 705/7.15 |
| 2011/0295913 A1* | 12/2011 | Enbutsu | 707/812 |
| 2012/0005166 A1* | 1/2012 | Pace et al. | 707/654 |
| 2012/0059792 A1* | 3/2012 | Kundu et al. | 707/610 |
| 2012/0185432 A1* | 7/2012 | Ding | 707/620 |

FOREIGN PATENT DOCUMENTS

| | | |
|---|---|---|
| CN | 1652116 A | 8/2005 |
| CN | 101317164 A | 12/2008 |
| CN | 101369283 A | 2/2009 |
| CN | 101551801 A | 10/2009 |
| EP | 1024441 A2 | 8/2000 |

OTHER PUBLICATIONS

SR Alapati—Expert Oracle Database 10 g Administration, 2005—Springer "Loading and Transforming data—Chpater 3" (pp. 539-587).*

International Search Report in international application No. PCT/CN2010/071725, mailed on Jul. 29, 2010.

English Translation of the Written Opinion of the International Search Authority in international application No. PCT/CN2010/071725, mailed on Jul. 29, 2010.

* cited by examiner

METHOD, DEVICE AND SYSTEM FOR IMPLEMENTING DATA SYNCHRONIZATION BETWEEN SOURCE DATABASE AND TARGET DATABASE

TECHNICAL FIELD

The disclosure relates to the field of databases, in particular to a method, device and system for implementing data synchronization between a source database and a target database.

BACKGROUND

Since Dr. E. F. Codd proposed an initial theoretical model in 1970, a relation-type database has become an essential infrastructure in all information systems, and ranks only second to operating systems. Today, large-scale systems, which can operate without databases, have not existed any more.

Figure 1:
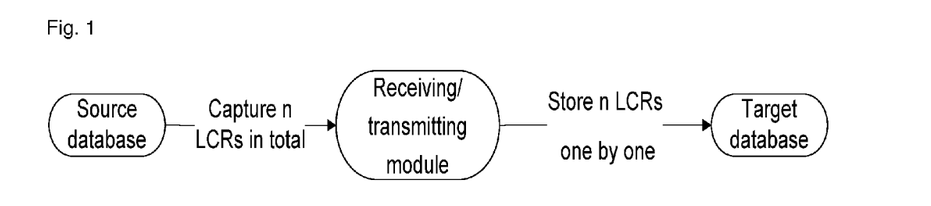
FIG. 1 shows a diagram of a traditional data synchronization process.

In actual application, due to the complicacy of service logics and the modularized design of functions, one information system is always deployed with multiple databases, and the multiple databases have to collaborate and share data with each other, and this requires data synchronization among the databases. In order to achieve this purpose, mainstream database vendors have developed their respective data synchronization technologies, such as, Streams from Oracle and Replication Server from Sybase. FIG. 1 shows a diagram of a traditional data synchronization process, and as shown in FIG. 1, Logical Change Records (LCRs) are captured from a database redo log in a source database, and are applied one by one to a target database according to the occurrence sequence of the LCRs, so that the synchronization of data in the target database with data in the source database is achieved.

LCR is a general name of a database change record in the technical field of databases, one LCR shows one specific Database Manipulation Language (DML) operation on one specific record in a source database, the contents of the LCR include: an operation type, a changed field list, a field value before change, a field value after change, a field name of a primary key, a field value of the primary key and so on; according to these pieces of information, the DML operation can be repeated.

The current data synchronization technologies have the following defects:

a source database sends all changed LCRs to a target database, therefore, when the source database changes frequently, the work load of LCR transmission is large.

SUMMARY

The technical problem to be solved in the disclosure is to provide a method, device and system for implementing data synchronization between a source database and a target database, to save resources of the target database.

In order to solve the above technical problem, embodiments of the disclosure provide the following technical solution.

A method for implementing data synchronization between a source database and a target database includes:

acquiring, by a synchronization device, at least one first Logical Change Record (LCR) and a keyword of the first LCR from a source database;

determining, by the synchronization device, whether there is a second LCR with a keyword as same as the keyword of the first LCR in the synchronization device itself, and generating, by the synchronization device, a determination result;

processing, by the synchronization device, the first LCR to generate a processed LCR according to the determination result, so that the synchronization device stores only one LCR containing the keyword of the first LCR;

sending, by the synchronization device, the processed LCR to a target database.

The processing, by the synchronization device, the first LCR to generate a processed LCR according to the determination result may include:

when the determination result is YES, merging, by the synchronization device, the first LCR with the second LCR to generate the processed LCR, according to an operation type of the first LCR and an operation type of the second LCR;

when the determination result is NO, storing, by the synchronization device, the first LCR in the synchronization device as the processed LCR.

The merging, by the synchronization device, the first LCR and the second LCR to generate the processed LCR may include:

when the operation type of the first LCR is INSERT and the operation type of the second LCR is INSERT or UPDATE, taking, by the synchronization device, the second LCR as the processed LCR;

when the operation type of the first LCR is INSERT and the operation type of the second LCR is DELETE, changing, by the synchronization device, the operation type of the second LCR to UPDATE, and covering, by the synchronization device, a corresponding field value of the second LCR with each field value of the first LCR, to generate the processed LCR;

when the operation type of the first LCR is UPDATE and the operation type of the second LCR is INSERT or UPDATE, covering, by the synchronization device, a corresponding field value of the second LCR with each field value of the first LCR, to generate the processed LCR;

when the operation type of the first LCR is UPDATE or DELETE and the operation type of the second LCR is DELETE, taking, by the synchronization device, the second LCR as the processed LCR;

when the operation type of the first LCR is DELETE and the operation type of the second LCR is INSERT, taking, by the synchronization device, the first LCR as the processed LCR; and when the operation type of the first LCR is DELETE and the operation type of the second LCR is UPDATE, changing the type of the second LCR to DELETE and taking the second LCR as the processed LCR by the synchronization device.

The sending, by the synchronization device, the processed LCR to a target database may include:

sending, by the synchronization device, the processed LCR to the target database in a bulk binding way.

The sending, by the synchronization device, the processed LCR to the target database in a bulk binding way may include:

when the number of the processed LCRs reaches a predetermined threshold, sending, by the synchronization device, the processed LCRs to the target database in a bulk binding way; or sending, by the synchronization device, the processed LCRs to the target database in a bulk binding way every fixed period.

The keyword of the first LCR may be a primary key or an identifier of the first LCR.

A synchronization device includes:

an acquiring unit, configured to acquire at least one first LCR and a keyword of the first LCR from a source database;

a determining unit, configured to determine whether there is a second LCR with a keyword as same as the keyword of the first LCR in the determining unit itself, and to generate a determination result;

a processing unit, configured to process the first LCR to generate a processed LCR according to the determination result; and a sending unit, configured to send the processed LCR to a target database.

The processing unit may include:

a merging unit, configured to, when the determination result is YES, merge the first LCR with the second LCR to generate the processed LCR according to an operation type of the first LCR and an operation type of the second LCR;

a storage unit, configured to, when the determination result is NO, store the first LCR as the processed LCR.

A synchronization system includes: a synchronization device, a source database and a target database, wherein the synchronization device includes:

an acquiring unit, configured to acquire at least one first LCR and a keyword of the first LCR from the source database;

a determining unit, configured to determine whether there is a second LCR with a keyword as same as the keyword of the first LCR in the determining unit itself, and to generate a determination result;

a processing unit, configured to process the first LCR to generate a processed LCR according to the determination result; and a sending unit, configured to send the processed LCR to the target database.

The synchronization device may be arranged on the source database or the target database, or may be independent of the source database or the target database.

The embodiments of the present disclosure have the following advantageous effects:

In above solution, when data synchronization is implemented between a source database and a target database, not all changed LCRs are sent to the target database, instead, they are buffered in a synchronization device; in this way, even if the source database changes frequently, each time the synchronization device acquires the first LCR from the source database, it processes the first LCR in the synchronization device first, that is, the synchronization device determines whether a second LCR with the keyword of the first LCR exists in the synchronization device itself and generates a determination result; the synchronization device processes the first LCR to generate a processed LCR according to the determination result, so that the synchronization device stores only one LCR containing the keyword of the first LCR, then the synchronization device sends the processed LCR to the target database. Compared with the prior art, the work load of LCR transmission is reduced.

DETAILED DESCRIPTION

In order to make the technical problem to be solved, technical solution and advantages in embodiments of the disclosure more clear, detailed description will be given below in conjunction with drawings and specific embodiments.

As to the problem of large LCR transmission load during data synchronization between a source database and a target database in the prior art, the embodiments of the disclosure provide a method, device and system for implementing data synchronization between a source database and a target database.

Figure 2:
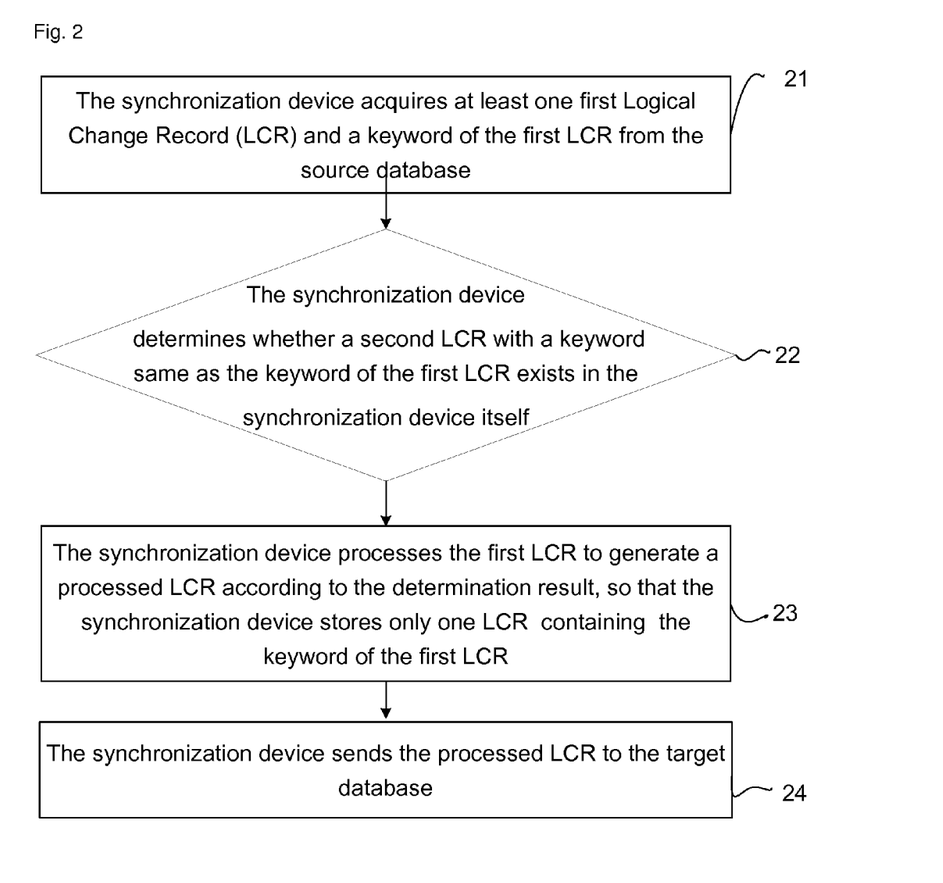
FIG. 2 shows a flow diagram of a method for implementing data synchronization between a source database and a target database in the disclosure.

FIG. 2 shows a flow diagram of the method for implementing data synchronization between a source database and a target database in the disclosure; as shown in FIG. 2, the method for implementing data synchronization between a source database and a target database comprises:

step 21: a synchronization device acquires at least one first Logical Change Record (LCR) and a keyword of the first LCR from a source database;

step 22: the synchronization device determines whether a second LCR whose keyword is as same as the keyword of the first LCR exists in the synchronization device itself, and then generates a determination result;

step 23: the synchronization device processes the first LCR to generate a processed LCR according to the determination result, so that the synchronization device stores only one LCR containing the keyword of the first LCR; and step 24: the synchronization device sends the processed LCR to a target database.

In the above solution, when data synchronization is implemented between the source database and the target database, not all changed LCRs are sent to the target database, instead, they are buffered in the synchronization device; in this way, even if the source database changes frequently, each time the synchronization device acquires the first LCR from the source database, it processes the first LCR in the synchronization device first, that is, the synchronization device determines whether there is a second LCR with the keyword of the first LCR in the synchronization device itself and generates a determination result; the synchronization device processes the first LCR to generate the processed LCR according to the determination result, so that the synchronization device stores only one LCR containing the keyword of the first LCR, then the synchronization device sends the processed LCR to the target database. Compared with the prior art, the work load of LCR transmission is reduced.

Wherein, the step 23 comprises:

when the determination result is YES, the synchronization device merges the first LCR with the second LCR to generate the processed LCR, according to the operation type of the first LCR and the operation type of the second LCR;

when the determination result is NO, the synchronization device stores the first LCR in the synchronization device and takes the first LCR as the processed LCR.

Specifically, the step of the synchronization device merging the first LCR with the second LCR to generate the processed LCR according to the operation type of the first LCR and the operation type of the second LCR may comprise:

when the operation type of the first LCR is INSERT and the operation type of the second LCR is INSERT or UPDATE, the synchronization device takes the second LCR as the processed LCR;

when the operation type of the first LCR is INSERT and the operation type of the second LCR is DELETE, the synchronization device changes the operation type of the second LCR to UPDATE, and covers a corresponding field value of the second LCR with each field value of the first LCR, to generate the processed LCR;

when the operation type of the first LCR is UPDATE and the operation type of the second LCR is INSERT or UPDATE, the synchronization device covers a corresponding field value of the second LCR with each field value of the first LCR, to generate the processed LCR;

when the operation type of the first LCR is UPDATE or DELETE and the operation type of the second LCR is DELETE, the synchronization device takes the second LCR as the processed LCR;

when the operation type of the first LCR is DELETE and the operation type of the second LCR is INSERT, the synchronization device takes the first LCR as the processed LCR;

when the operation type of the first LCR is DELETE and the operation type of the second LCR is UPDATE, the synchronization device changes the type of the second LCR to DELETE and takes the second LCR as the processed LCR.

The step 24 may comprise: the synchronization device sends the processed LCR to the target database in a bulk binding way.

The step of sending the processed LCR by the synchronization device to the target database in a bulk binding way comprises:

when the number of the processed LCRs reaches a predetermined threshold, the synchronization device sends the processed LCRs to the target database in a bulk binding way; or the synchronization device sends the processed LCR to the target database in a bulk binding way every fixed period.

The keyword of the first LCR is a primary key or an identifier of the first LCR.

Figure 3:
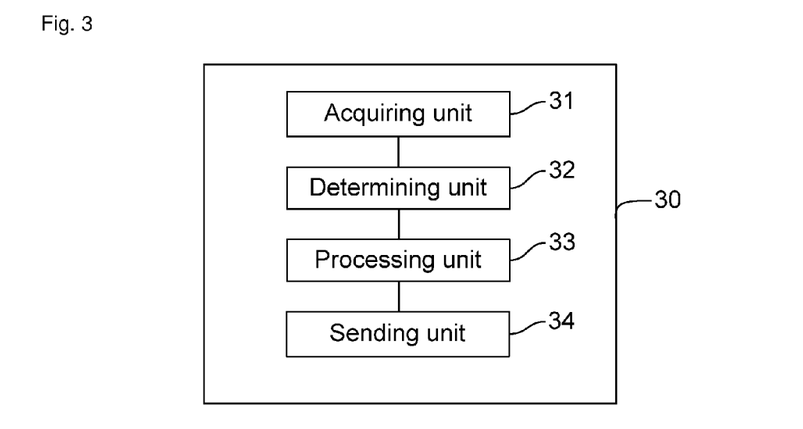
FIG. 3 shows a structural diagram of a synchronization device in the disclosure.

FIG. 3 shows a structural diagram of a synchronization device in the disclosure; as shown in FIG. 3, a synchronization device 30 of the disclosure comprises:

an acquiring unit 31, configured to acquire at least one first LCR and a keyword of the first LCR from a source database;

a determining unit 32, configured to determine whether there is a second LCR whose keyword is as same as the keyword of the first LCR, and to generate a determination result;

a processing unit 33, configured to process the first LCR to generate a processed LCR according to the determination result;

a sending unit 34, configured to send the processed LCR to a target database.

In the above solution, when data synchronization is implemented between the source database and the target database, not all changed LCRs are sent to the target database, instead, they are buffered in the synchronization device; in this way, even if the source database changes frequently, each time the synchronization device acquires the first LCR from the source database, it processes the first LCR in the synchronization device first, that is, the synchronization device determines whether there is a second LCR containing the keyword of the first LCR in the synchronization device itself and generates a determination result; the synchronization device processes the first LCR to generate a processed LCR according to the determination result, so that the synchronization device stores only one LCR containing the keyword of the first LCR, then the synchronization device sends the processed LCR to the target database. Compared with the prior art, the work load of LCR transmission is reduced.

The processing unit 33 comprises:

a merging unit, configured to, when the determination result is YES, merge the first LCR with the second LCR to generate the processed LCR according to the operation type of the first LCR and the operation type of the second LCR;

a storage unit, configured to, when the determination result is NO, store the first LCR which is taken as the processed LCR.

The merging unit is specifically configured to:

when the operation type of the first LCR is INSERT and the operation type of the second LCR is INSERT or UPDATE, take the second LCR as the processed LCR;

when the operation type of the first LCR is INSERT and the operation type of the second LCR is DELETE, change the operation type of the second LCR to UPDATE, cover a corresponding field value of the second LCR with each field value of the first LCR, to generate the processed LCR;

when the operation type of the first LCR is UPDATE and the operation type of the second LCR is INSERT or UPDATE, cover a corresponding field value of the second LCR with each field value of the first LCR, to generate the processed LCR;

when the operation type of the first LCR is UPDATE or DELETE and the operation type of the second LCR is DELETE, take the second LCR as the processed LCR;

when the operation type of the first LCR is DELETE and the operation type of the second LCR is INSERT, take the first LCR as the processed LCR; and when the operation type of the first LCR is DELETE and the operation type of the second LCR is UPDATE, change the type of the second LCR to DELETE and take the second LCR as the processed LCR.

Wherein the sending unit 34 may send the processed LCRs to the target database in a bulk binding way.

Further, when the number of the processed LCRs reaches a predetermined threshold, the sending unit 34 may send the processed LCRs to the target database in a bulk binding way; or, the sending unit 34 sends the processed LCRs to the target database in a bulk binding way every fixed period. The keyword of the first LCR is a primary key or an identifier of the first LCR.

Figure 4:
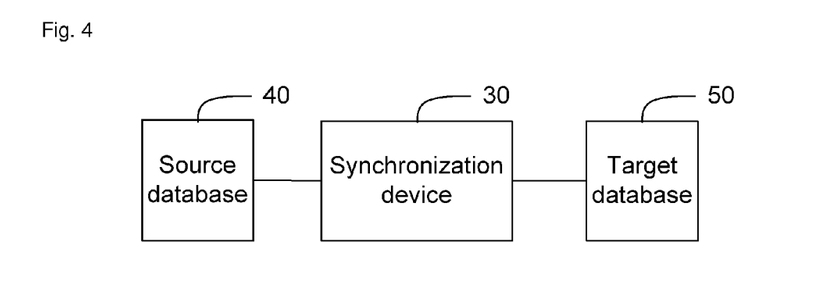
FIG. 4 shows a structural diagram of a synchronization system in the disclosure.

FIG. 4 shows a structural diagram of a synchronization system in the disclosure; as shown in FIG. 4, the synchronization system comprises: a synchronization device 30, a source database 40 and a target database 50, wherein the synchronization device 30 comprises:

an acquiring unit 31, configured to acquire at least one first LCR and a keyword of the first LCR from a source database;

a determining unit 32, configured to determine whether a second LCR whose keyword is as same as the keyword of the first LCR exists in the determining unit itself, and to generate a determination result;

a processing unit 33, configured to process the first LCR to generate a processed LCR according to the determination result; and a sending unit 34, configured to send the processed LCR to a target database.

In the above solution, when data synchronization is implemented between the source database and the target database, not all changed LCRs are sent to the target database, instead, they are buffered in a synchronization device; in this way, even if the source database changes frequently, each time the synchronization device acquires the first LCR from the source database, it processes the first LCR in the synchronization device first, that is, the synchronization device determines whether there is a second LCR containing the keyword of the first LCR in the synchronization device itself and generates a determination result; the synchronization device processes the first LCR to generate a processed LCR according to the determination result, so that the synchronization device stores only one LCR containing the keyword of the first LCR, then the synchronization device sends the processed LCR to the target database. Compared with the prior art, the work load of LCR transmission is reduced.

The synchronization device is arranged on the source database or the target database, or it is independent from the source database or the target database.

Figure 5:
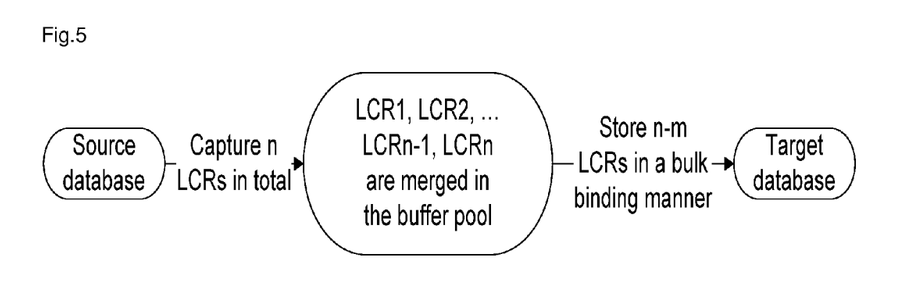
FIG. 5 shows a process diagram of the method for implementing data synchronization between a source database and a target database in the disclosure.

FIG. 5 shows a process diagram of the method for implementing data synchronization between a source database and a target database in the disclosure; as shown in FIG. 5, the high-speed data synchronization method based on a desynchronizing mirroring mechanism in the disclosure comprises: LCRs of the source database are cached in a buffer pool, wherein the buffer pool is a synchronization device; if an LCR of a certain record has already existed, LCR merging is executed, and m is the number of LCRs merged during the merging process, so that only one LCR determined by a certain keyword exists in the buffer pool; after a period of time, the merged LCRs are sent to the target database to be stored; under this model, it looks like some LCRs are lost during the synchronization process, and actually, the LCRs existing in the buffer pool are mirror images of original records, the mirror images existing in special form, therefore this synchronization model is called "desynchronizing mirroring". By adopting this model, the number of LCRs to be sent to the target database to be executed is reduced, system resources are saved, and the influence on major services of the target database is decreased. Meanwhile, since an LCR for a same record only exists in the buffer pool once, the technology of bulk binding can be employed to achieve bulk storage, thus the speed of storage is improved. To achieve above purpose, the disclosure, as to the case of merging in the buffer pool through different DMLs, creates a set of merging rules and executes bulk binding storage of the merged LCRs in the pool at a fixed time or a fixed quantity.

The method for implementing data synchronization between a source database and a target database in the disclosure is described below, which comprises the following steps.

Step 1: a buffer pool with a proper size is allocated in a machine which is connected with a source database and a target database at the same time, wherein the machine is the synchronization device described above, and the buffer pool can completely reside in a system memory, or can be stored in a disk by means of expansion when the system memory is not large enough to accommodate the buffer pool.

Step 2: a set of data management mechanism is created in the buffer pool, wherein the mechanism can realize:

storing one LCR;

determining whether there is an LCR meeting the requirement according to a value of a keyword; that is to say, determining whether an LCR with a keyword of a new LCR exists in the buffer pool; the keyword can be a primary key of the new LCR;

finding out the LCR meeting the requirement in the pool according to the value of the keyword of the new LCR;

locating the LCR meeting the requirement according to the value of the keyword and updating the LCR;

quickly locating the LCR meeting the requirement according to the value of the keyword and deleting it.

Step 3: LCRs are acquired from a database log (i.e. redo log) of the source database and sending the LCRs to the buffer pool.

Step 4: after the buffer pool receives the LCRs, the buffer pool stores or merges the LCRs using its own LCR processing function.

Step 5: two types of thresholds are set in order to guarantee the timeliness of the synchronization process.

The first type is a quantitative threshold, that is to say, when the number of the LCRs cached in the buffer pool reaches a certain value, the data is sent to the target database for application;

the second type is a time threshold, that is to say, when the time determined by the time threshold has passed since the last time of sending the data to the target database for application, the data is sent to the target database for application.

Step 6: when any one of the two types of thresholds involved in the step 5 is met, the data is applied to the target database in a bulk binding way.

In this method, it is needed to establish a buffer pool and create a set of LCR management mechanisms in the buffer pool; and during the period when LCRs exist in the buffer pool, in the case that there are LCRs with same keyword, the LCRs are merged, thus the total number of LCRs is reduced; LCRs are first cached in the buffer pool for a period of time and then applied to the target database; there are two storage trigger conditions including: triggering at a fixed time and triggering with a fixed quantity, thus guaranteeing the timeliness of LCR application; and the technology of bulk binding realizes high-speed storage.

Figure 6:
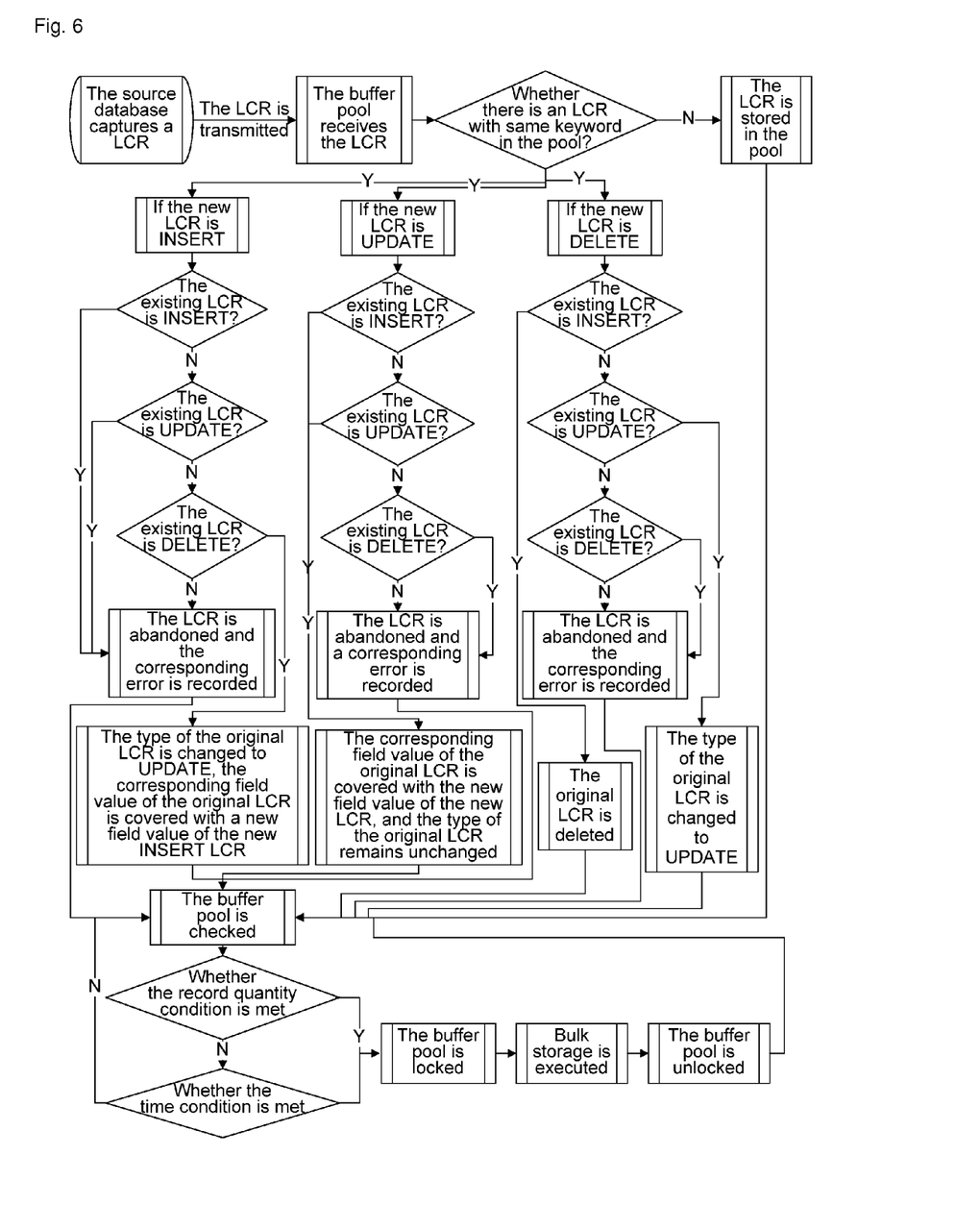
FIG. 6 shows a process diagram of an embodiment of the method for implementing data synchronization between a source database and a target database in the disclosure.

FIG. 6 shows a process diagram of an embodiment of the method for implementing data synchronization between a source database and a target database in the disclosure; as shown in FIG. 6, the method for implementing data synchronization between a source database and a target database in another embodiment of the disclosure comprises the following steps.

Step 1: it is determined that a host can communicate with a source database and a target database at the same time, and is equipped with basic software for operating the source database and the target database, such as oci database and ct-lib database, the host acting as a synchronization device.

Step 2: a buffer pool with a proper size is allocated, wherein the buffer pool can completely reside in system memory, or the buffer pool can be stored in a disk by means of expansion when the system memory is not large enough to accommodate the buffer pool.

Step 3: a set of quick index mechanisms is created in the buffer pool based on technologies such as hash or b-tree or rbt, through which an LCR can be added, deleted, modified and found quickly.

Step 4: a set of LCR merging mechanisms is created in the pool, specifically as follows:

case 1: when a new INSERT LCR is acquired, and it is found in the buffer pool at this time that:

case 1.1: if there is no LCR which has the same keyword as the new LCR, then the new LCR is stored in the buffer pool;

case 1.2: if there has existed one INSERT LCR which has the same keyword as the new LCR, then the new LCR is abandoned and the abnormal condition is recorded;

case 1.3: if there has existed one UPDATE LCR which has the same keyword as the new LCR, then the new LCR is abandoned and the abnormal condition is recorded;

case 1.4: if there has existed one DELETE LCR which has the same keyword as the new LCR, then the type of the original LCR is changed to UPDATE, and a corresponding field value of the original LCR is covered with each new field value of the new INSERT LCR.

case 2: when a new UPDATE LCR is acquired, and it is found in the buffer pool at this time that:

case 2.1: if there is no LCR which has the same keyword as the new LCR, then the new LCR is stored into the buffer pool;

case 2.2: if there has existed one INSERT LCR which has the same keyword as the new LCR, then a corresponding field value of the original LCR is covered with each new field value of the new LCR, and the type of the original LCR remains INSERT;

case 2.3: if there has existed one UPDATE LCR which has the same keyword as the new LCR, then a corresponding field value of the original LCR is covered with each new field value of the new LCR, and the type of the original LCR remains UPDATE;

case 2.4: if there has existed one DELETE LCR which has the same keyword as the new LCR, then the new LCR is abandoned and the abnormal condition is recorded.

case 3: when a new DELETE LCR is acquired, and it is found in the buffer pool at this time that:

case 3.1: if there is no LCR which has the same keyword as the new LCR, then the new LCR is stored into the buffer pool;

case 3.2: if there has existed one INSERT LCR which has the same keyword as the new LCR, then the original LCR is deleted;

case 3.3: if there has existed one UPDATE LCR which has the same keyword as the new LCR, then the type of the original LCR is changed to DELETE;

case 3.4: if there has existed one DELETE LCR which has the same keyword as the new LCR, then the new LCR is abandoned and the abnormal condition is recorded.

Step 5: a quantity threshold and a time threshold are set for the buffer pool;

Step 6: the number of LCRs in the buffer pool is checked; if it does not reach the quantity threshold, then the process jumps to step 7; if it has already reached the quantity threshold, then the buffer pool is locked to prohibit new LCRs from entering the pool, all LCRs in the pool are applied to the target database by using the bulk storage mechanism, and errors occurring during the bulk storage process are recorded. When the storage action is finished, the time point is recorded; and the process returns to step 7.

Step 7: it is checked whether the current time calculated from the time point of finishing the last storage action has already exceeded the time threshold; if it has not exceeded the time threshold, then the process returns to step 6; if it has exceeded the time threshold, then all LCRs in the pool are applied to the target database by using the bulk storage mechanism, and errors occurring during bulk storage process are recorded. When the storage action is finished, the time point is recorded; and the process returns to step 6.

The first application scene of the method for implementing data synchronization between a source database and a target database in the disclosure will be described below. In this application scene, one LCR is triggered based on the quantity condition and applied to the target database in the case that there is no same keyword in the buffer pool. The application scene comprises the following steps:

step 1: it is assumed that there is a table DEMO_TAB in both the source database and the target database, which is defined as follows:

```
CREATE TABLE DEMO_TAB(
    FLD_A NUMBER PRIMARY KEY,
    FLD_B CHAR(100),
    FLD_C VARCHAR(100))
``` the four fields in this table represent three most common data types, wherein FLD_A is a primary key;

step 2: INSERT actions are executed for N times in the source database:

```
INSERT INTO DEMO_TAB VALUES(1,'CHAR1','VARCHAR1');
INSERT INTO DEMO_TAB VALUES(2,'CHAR2','VARCHAR2');
...
INSERT INTO DEMO_TAB VALUES(N,'CHARN','VARCHARN');
``` step 3: the N INSERT actions are captured through the LCR capture mechanism, wherein the contents of the captured LCRs are as follows:

LCR1 contents:

| Table name: DEMO_TAB | Operation type: INSERT |
|---|---|

Original value list of fields: None (INSERT action has no original value list)

New value list of fields:

| Field 1: name: FLD_A; | type: NUMBER; | value: 1 |
|---|---|---|
| Field 2: name: FLD_B; | type: CHAR; | value: CHAR1 |
| Field 3: name: FLD_C; | type: VARCHAR; | value: VARCHAR1 |

(Subsequent LCR contents are similar to those of LCR 1, only the field values are different)

step 4: the N LCRs are sent to the buffer pool;

step 5: through searching, no LCR which has the same keyword as the new LCRs is found in the pool;

step 6: the N LCRs are stored into the buffer pool.

step 7: the number of LCRs in the pool are detected to have already exceeded the quantity threshold;

step 8: the buffer pool is locked to prohibit new LCRs from entering the pool;

step 9: the LCRs are fast stored into the pool for one time by using the technology of bulk binding; and step 10: the buffer pool is unlocked.

The second application scene of the method for implementing data synchronization between a source database and a target database in the disclosure will be described below. In this application scene, one new LCR is triggered based on the time condition and applied to the target database in the case that an LCR having the same keyword as the new LCR exists in the buffer pool. The application scene comprises the following steps:

step 1: the table structure of the table in the step 1 in the last application scene is adopted, and a record is inserted into the table:

INSERT INTO DEMO_TAB VALUES (1,'CHAR1', 'VARCHAR1');

step 2: UPDATE actions are executed for N times regarding to this record in the source database:

```
UPDATE DEMO_TAB SET FLD_B='NEWCHAR1',
    FLD_C='NEWVARCHAR1' WHERE FLD_A=1;
UPDATE DEMO_TAB SET FLD_B='NEWCHAR2',
```

```
    FLD_C='NEWVARCHAR2' WHERE FLD_A=1;
...
UPDATE DEMO_TAB SET FLD_B='NEWCHARN',
    FLD_C='NEWVARCHARN' WHERE FLD_A=1;
``` step 3: the N UPDATE actions are captured through the LCR capture mechanism, wherein the contents of the captured LCRs are as follows:
LCR1 contents:

| Table name: DEMO_TAB | Operation type: UPDATE |
|---|---|

Original value list of fields:

| Field 2: name: FLD_B; | type: CHAR; | value: CHAR1 |
|---|---|---|
| Field 3: name: FLD_C; | type: VARCHAR; | value: VARCHAR1 |

New value list of fields:

| Field 2: name: FLD_B; | type: CHAR; | value: NEWCHAR1 |
|---|---|---|
| Field 3: name: FLD_C; | type: VARCHAR; | value: NEWVARCHAR1 |

Keyword information:

| Field 1: name: FLD_A; | type: NUMBER; | value: 1 |
|---|---|---|

(Subsequent LCR contents are similar to those of LCR 1, only the field values in the new value list are different)

step 4: the N LCRs are sent to the buffer pool in turn;
step 5: through searching, there is no LCR which has a keyword the same as LCR1 in the pool;
step 6: LCR1 is stored into the buffer pool;
step 7: when LCR2 is stored into the pool and checked, if LCR1 having the same keyword as LCR2 is found in the pool, then the two LCRs are merged according to the merging rules: replacing the value of each field in the new value list of LCR1 in the pool with the corresponding field value in the new value list of LCR2, and then abandoning LCR2; this process is repeatedly performed for each subsequent LCR until LCR N is abandoned;
step 8: the number of LCRs in the pool are detected to have already exceeded the quantity threshold;
step 9: it is checked whether the current time calculated from the time of finishing last storage action exceeds the time threshold, and found out that the time has already exceeded the time threshold;
step 10: the buffer pool is locked to prohibit new LCRs from entering the pool;
step 11: the LCRs are stored into the pool for one time with high speed by using the technology of bulk binding; and
step 12: the buffer pool is unlocked.

The method, device and system for realizing high-speed data synchronization based on the desynchronizing mirroring mechanism can optimize quick storage by using the technology of bulk binding, and the target database does not need to apply all LCRs delivered from the source database one by one, thus the synchronization speed is improved.

The method embodiments correspond to the device embodiments, so those parts not described in details in the method embodiments can be referred to descriptions in relative parts in the device embodiments, and those parts not described in details in the device embodiments can be referred to descriptions in relative parts in the method embodiments.

It should be understood by those skilled in the art that all or part of the steps for realizing the method in the embodiments can be implemented by a program instructing relative hardware, wherein the program can be stored in a computer readable storage medium and execute the steps described in the method embodiments, the storage medium being disk, disc, Read-Only Memory (ROM) or Random Access Memory (RAM) or the like.

In the method embodiments of the disclosure, the sequence number of the steps are not used for limiting the sequence of the steps; for those skilled in the art, changes of the sequence of the steps without any creative work are also within the protection scope of the disclosure.

The above mentioned only describes the preferred embodiments of the disclosure, it should be noted that, for those skilled in the art, some improvements and elaborations can be made without departing from the principle of the disclosure, and those improvements and elaborations should be included within the protection scope of the disclosure.

The invention claimed is:

1. A method for implementing data synchronization between a source database and a target database, comprising:
acquiring, by the synchronization device comprising one or more processors, at least one first Logical Change Record (LCR) and a keyword of the first LCR from a source database;
determining, by the synchronization device, whether there is a second LCR with a keyword as same as the keyword of the first LCR in the synchronization device itself, and generating, by the synchronization device, a determination result;
processing, by the synchronization device, the first LCR to generate a processed LCR according to the determination result, so that the synchronization device stores only one LCR containing the keyword of the first LCR;
sending, by the synchronization device, the processed LCR to a target database;
wherein the step of processing, by the synchronization device, the first LCR to generate a processed LCR according to the determination result comprises:
when the determination result is YES, merging, by the synchronization device, the first LCR and the second LCR to generate the processed LCR, according to an operation type of the first LCR and an operation type of the second LCR;
when the determination result is NO, storing, by the synchronization device, the first LCR into the synchronization device as the processed LCR;
wherein the step of merging, by the synchronization device, the first LCR and the second LCR to generate the processed LCR comprises:
when the operation type of the first LCR is INSERT and the operation type of the second LCR is INSERT or UPDATE, taking, by the synchronization device, the second LCR as the processed LCR;
when the operation type of the first LCR is INSERT and the operation type of the second LCR is DELETE, changing, by the synchronization device, the operation type of the second LCR to UPDATE, and covering, by the synchronization device, a corresponding field value of the second LCR with each field value of the first LCR, to generate the processed LCR;

when the operation type of the first LCR is UPDATE and the operation type of the second LCR is INSERT or UPDATE, covering, by the synchronization device, a corresponding field value of the second LCR with each field value of the first LCR, to generate the processed LCR;

when the operation type of the first LCR is UPDATE or DELETE and the operation type of the second LCR is DELETE, taking, by the synchronization device, the second LCR as the processed LCR;

when the operation type of the first LCR is DELETE and the operation type of the second LCR is INSERT, taking, by the synchronization device, the first LCR as the processed LCR; and when the operation type of the first LCR is DELETE and the operation type of the second LCR is UPDATE, changing the type of the second LCR to DELETE and taking the second LCR as the processed LCR by the synchronization device.

2. The method for implementing data synchronization between a source database and a target database according to claim 1, wherein the sending, by the synchronization device, the processed LCR to a target database comprises:

sending, by the synchronization device, the processed LCR to the target database in a bulk binding way.

3. The method for implementing data synchronization between a source database and a target database according to claim 2, wherein the sending, by the synchronization device, the processed LCR to the target database in a bulk binding way comprises:

when the number of the processed LCRs reaches a predetermined threshold, sending, by the synchronization device, the processed LCRs to the target database in a bulk binding way; or sending, by the synchronization device, the processed LCRs to the target database in a bulk binding way every fixed period.

4. The method for implementing data synchronization between a source database and a target database according to claim 1, wherein the keyword of the first LCR is a primary key or an identifier of the first LCR.

5. A synchronization device comprising one or more processors, comprising:

an acquiring unit, configured to acquire at least one first Logical Change Record (LCR) and a keyword of the first LCR from a source database;

a determining unit, configured to determine whether there is a second LCR with a keyword as same as the keyword of the first LCR in the determining unit itself, and to generate a determination result;

a processing unit, configured to process the first LCR to generate a processed LCR according to the determination result; and a sending unit, configured to send the processed LCR to a target database;

a merging unit, configured to, when the determination result is YES, merge the first LCR with the second LCR to generate the processed LCR according to an operation type of the first LCR and an operation type of the second LCR;

a storage unit, configured to, when the determination result is NO, store the first LCR as the processed LCR;

when the operation type of the first LCR is INSERT and the operation type of the second LCR is INSERT or UPDATE, the synchronization device takes the second LCR as the processed LCR;

when the operation type of the first LCR is INSERT and the operation type of the second LCR is DELETE, changing, by the synchronization device, the operation type of the second LCR to UPDATE, and the synchronization device covers a corresponding field value of the second LCR with each field value of the first LCR, to generate the processed LCR;

when the operation type of the first LCR is UPDATE and the operation type of the second LCR is INSERT or UPDATE, the synchronization device covers a corresponding field value of the second LCR with each field value of the first LCR, to generate the processed LCR;

when the operation type of the first LCR is UPDATE or DELETE and the operation type of the second LCR is DELETE, the synchronization device takes the second LCR as the processed LCR;

when the operation type of the first LCR is DELETE and the operation type of the second LCR is INSERT, the synchronization device takes the first LCR as the processed LCR; and when the operation type of the first LCR is DELETE and the operation type of the second LCR is UPDATE, the synchronization device changes the type of the second LCR to DELETE and takes the second LCR as the processed LCR.

6. The synchronization device according to claim 5, wherein the processing unit comprises:

a merging unit, configured to, when the determination result is YES, merge the first LCR with the second LCR to generate the processed LCR according to an operation type of the first LCR and an operation type of the second LCR;

a storage unit, configured to, when the determination result is NO, store the first LCR as the processed LCR.

7. A synchronization system, comprising: a synchronization device comprising one or more processors device, a source database and a target database, wherein the synchronization device comprises:

an acquiring unit, configured to acquire at least one first Logical Change Record (LCR) and a keyword of the first LCR from the source database;

a determining unit, configured to determine whether there is a second LCR with a keyword as same as the keyword of the first LCR in the determining unit itself, and to generate a determination result;

a processing unit, configured to process the first LCR to generate a processed LCR according to the determination result; and a sending unit, configured to send the processed LCR to the target database;

a merging unit, configured to, when the determination result is YES, merge the first LCR with the second LCR to generate the processed LCR according to an operation type of the first LCR and an operation type of the second LCR;

a storage unit, configured to, when the determination result is NO, store the first LCR as the processed LCR;

when the operation type of the first LCR is INSERT and the operation type of the second LCR is INSERT or UPDATE, the synchronization device takes the second LCR as the processed LCR;

when the operation type of the first LCR is INSERT and the operation type of the second LCR is DELETE, changing, by the synchronization device, the operation type of the second LCR to UPDATE, and the synchronization device covers a corresponding field value of the second LCR with each field value of the first LCR, to generate the processed LCR;

when the operation type of the first LCR is UPDATE and the operation type of the second LCR is INSERT or UPDATE, the synchronization device covers a corresponding field value of the second LCR with each field value of the first LCR, to generate the processed LCR;

when the operation type of the first LCR is UPDATE or DELETE and the operation type of the second LCR is DELETE, the synchronization device takes the second LCR as the processed LCR;

when the operation type of the first LCR is DELETE and the operation type of the second LCR is INSERT, the synchronization device takes the first LCR as the processed LCR; and when the operation type of the first LCR is DELETE and the operation type of the second LCR is UPDATE, the synchronization device changes the type of the second LCR to DELETE and takes the second LCR as the processed LCR.

8. The synchronization system according to claim 7, wherein the synchronization device is arranged on the source database or the target database, or is independent of the source database or the target database.

* * * * *